(12) United States Patent
Berger, III et al.

(10) Patent No.: US 9,261,391 B2
(45) Date of Patent: Feb. 16, 2016

(54) SYSTEM FOR MONITORING A SURFACE FOR GAS AND OIL FLOW

(71) Applicant: BERGER GEOSCIENCES, LLC, Houston, TX (US)

(72) Inventors: William J. Berger, III, Jersey Village, TX (US); James F. Keenan, Richmond, TX (US); Zachary I. Metz, Magnolia, TX (US); William J. Berger, II, Stagecoach, TX (US)

(73) Assignee: Berger Geosciences, LLC, Houston, TX (US)

( * ) Notice: Subject to any disclaimer, the term of this patent is extended or adjusted under 35 U.S.C. 154(b) by 5 days.

(21) Appl. No.: 14/563,968

(22) Filed: Dec. 8, 2014

(65) Prior Publication Data

US 2015/0146934 A1   May 28, 2015

Related U.S. Application Data

(63) Continuation-in-part of application No. 14/188,607, filed on Feb. 24, 2014, now Pat. No. 8,905,155.

(60) Provisional application No. 61/859,159, filed on Jul. 26, 2013.

(51) Int. Cl.
| | |
|---|---|
| *E21B 7/12* | (2006.01) |
| *E21B 47/12* | (2012.01) |
| *G01F 1/708* | (2006.01) |
| *G06T 7/20* | (2006.01) |
| *E21B 44/00* | (2006.01) |

(Continued)

(52) U.S. Cl.
CPC ................ *G01F 1/7086* (2013.01); *E21B 7/12* (2013.01); *E21B 21/001* (2013.01); *E21B 44/00* (2013.01); *E21B 47/10* (2013.01); *E21B 47/12* (2013.01); *G06T 7/20* (2013.01); *G06T 2207/10016* (2013.01); *G06T 2207/30242* (2013.01)

(58) Field of Classification Search
CPC .......... E21B 7/12; E21B 21/001; E21B 47/12
USPC ............. 175/5, 40, 57; 166/336, 358, 250.01; 348/85; 702/6; 703/10
See application file for complete search history.

(56) References Cited

U.S. PATENT DOCUMENTS

| | | | | |
|---|---|---|---|---|
| 4,001,764 | A | * | 1/1977 | Holland et al. .................... 367/6 |
| 4,520,665 | A | | 6/1985 | Cordier et al. |

(Continued)

*Primary Examiner* — Matthew Buck
(74) *Attorney, Agent, or Firm* — Gardere Wynne Sewell LLP; Chris P. Perque; Teresa J. Lechner-Fish

(57) ABSTRACT

A system for monitoring for gas and oil flow venting from a surface using time intervals, size and velocity, and using a processor with a data storage containing a bubble flow classification chart and bubble flow categories. The data storage receives at least one: video feed, drilling parameter data feed, seismic profile data feed, logging while drilling data feed, measurement while drilling data feed, sonar data feed, and hydrographic data feed to verify a determined bubble flow category and bubble flow classification as a baseline bubble flow classification and provides an alarm when a bubble flow emergency is ascertained due to a change in bubble flow classification without an anticipated change or changes outside predefined acceptable limits within the video feed, drilling parameter data feed, seismic profile data feed, logging while drilling data feed, sonar data feed, hydrographic data feed, or measurement while drilling data feed.

12 Claims, 11 Drawing Sheets

(51) Int. Cl.
*E21B 47/10* (2012.01)
*E21B 21/00* (2006.01)

(56) References Cited

U.S. PATENT DOCUMENTS

| | | | |
|---|---|---|---|
| 4,571,984 A * | 2/1986 | Malcosky | 73/19.03 |
| 4,658,750 A * | 4/1987 | Malcosky | 114/244 |
| 4,759,636 A | 7/1988 | Ahern et al. | |
| 4,948,258 A * | 8/1990 | Caimi | 356/603 |
| 6,578,405 B2 * | 6/2003 | Kleinberg et al. | 73/19.01 |
| 6,822,742 B1 * | 11/2004 | Kalayeh et al. | 356/437 |
| 7,036,451 B1 | 5/2006 | Hutchinson | |
| 8,767,063 B1 * | 7/2014 | Berger et al. | 348/85 |
| 8,905,155 B1 * | 12/2014 | Berger et al. | 175/5 |
| 2002/0053430 A1 | 5/2002 | Curtis et al. | |
| 2002/0063628 A1 | 5/2002 | Chuang | |
| 2004/0007392 A1 | 1/2004 | Judge et al. | |
| 2006/0129365 A1 * | 6/2006 | Hammond | 703/10 |
| 2006/0185899 A1 | 8/2006 | Alft et al. | |
| 2006/0186889 A1 | 8/2006 | Andreis | |
| 2007/0021916 A1 | 1/2007 | MacGregor et al. | |
| 2008/0008031 A1 | 1/2008 | Vigen et al. | |
| 2009/0087911 A1 | 4/2009 | Ramos | |
| 2010/0002076 A1 * | 1/2010 | Welker et al. | 348/81 |
| 2010/0005857 A1 | 1/2010 | Zhang et al. | |
| 2010/0044034 A1 | 2/2010 | Bailey et al. | |
| 2014/0284465 A1 * | 9/2014 | Pottorf et al. | 250/253 |

* cited by examiner

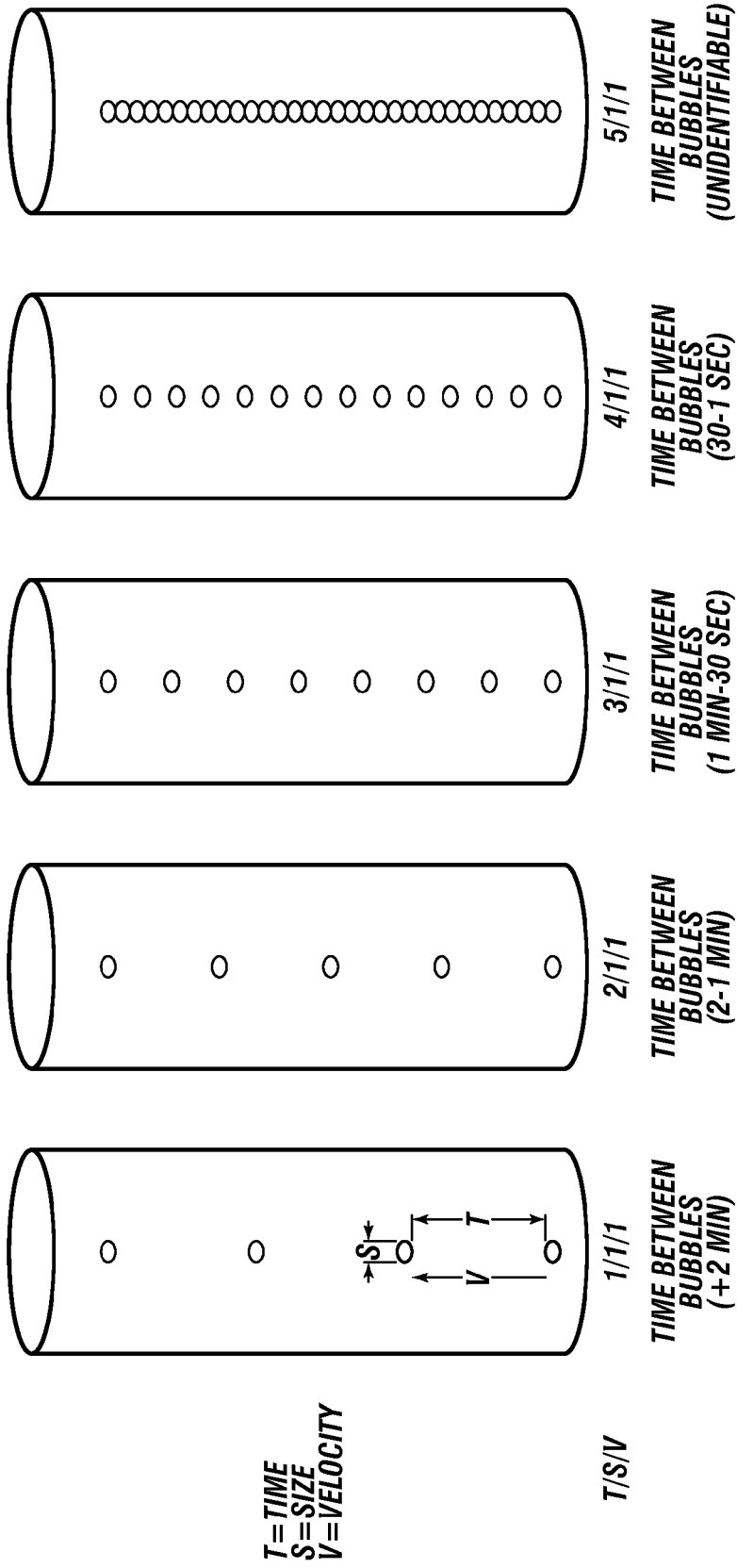

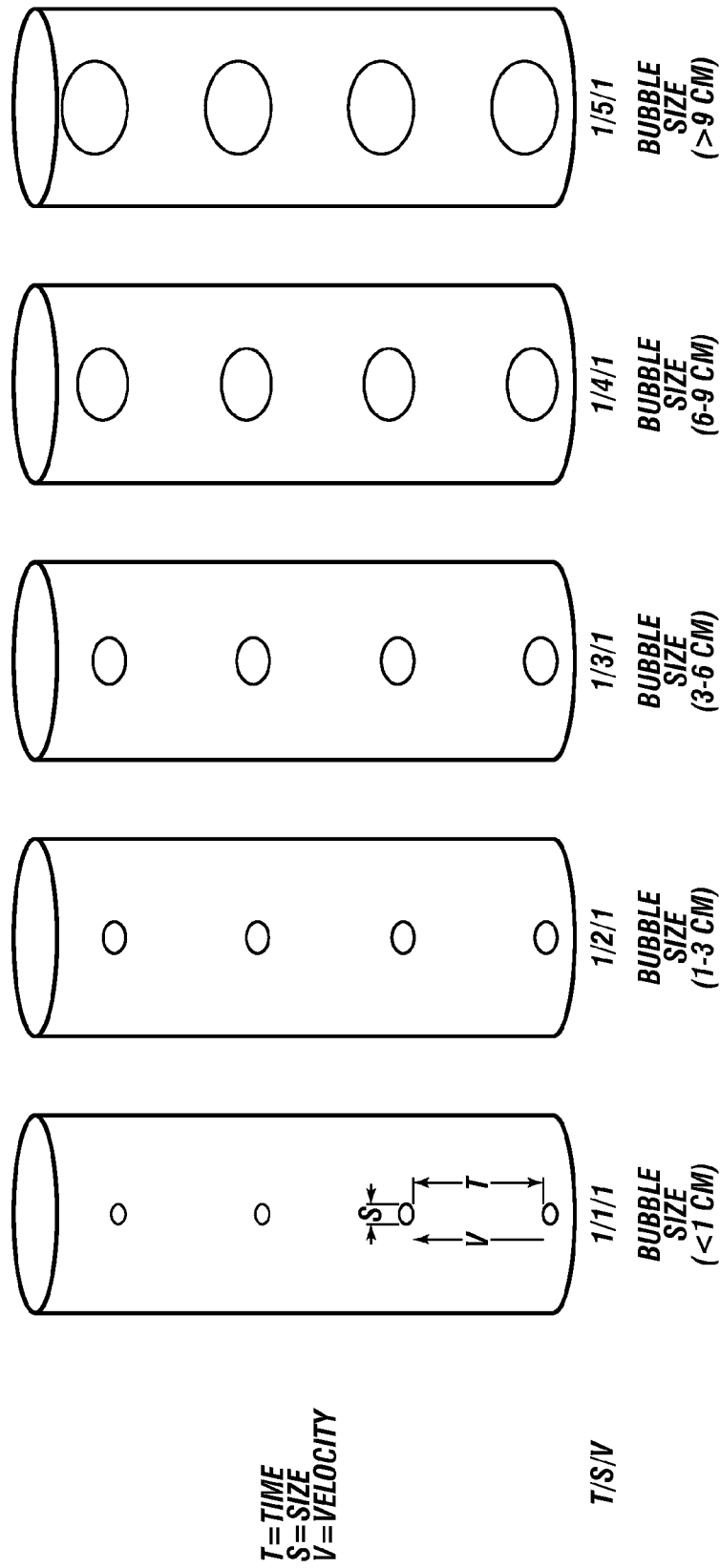

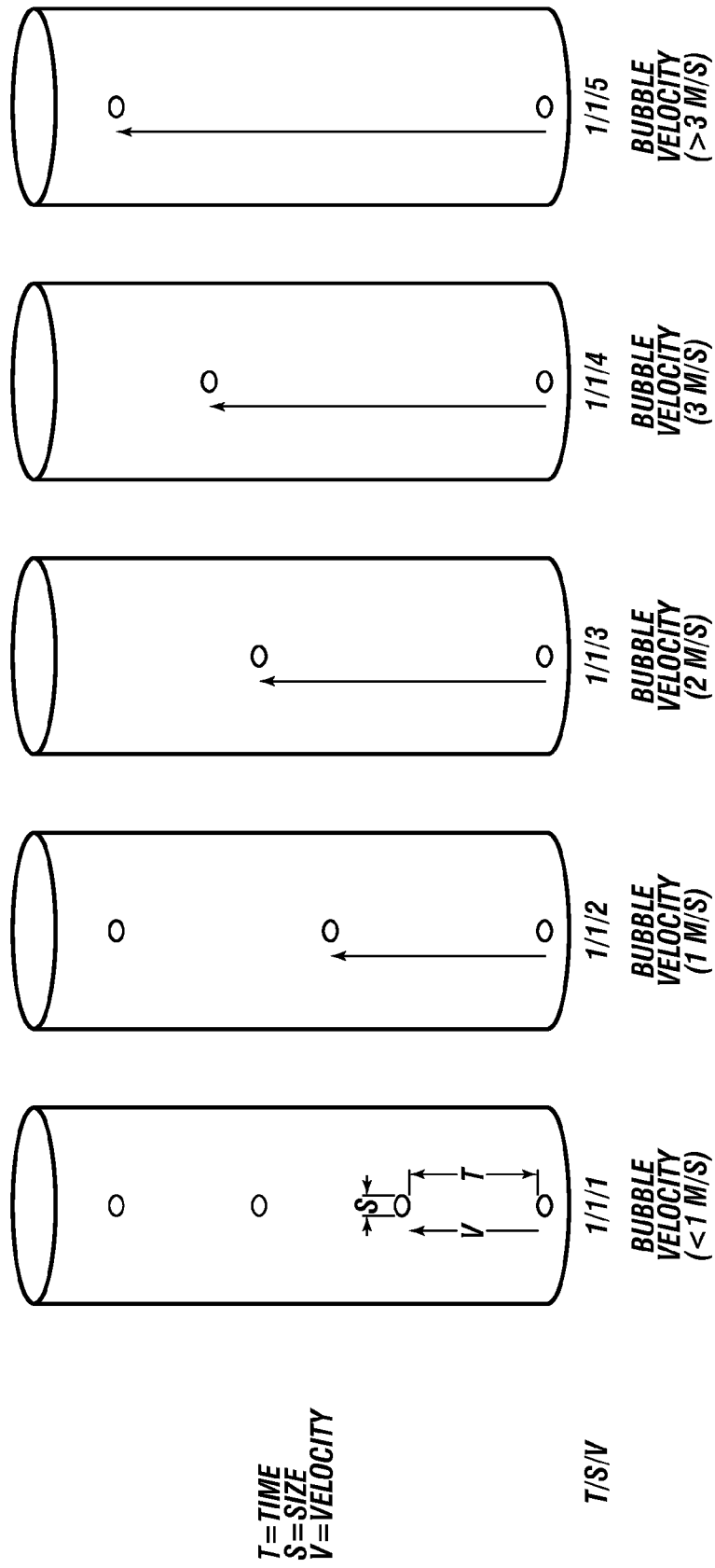

SYSTEM FOR MONITORING A SURFACE FOR GAS AND OIL FLOW

CROSS REFERENCE TO RELATED APPLICATIONS

The current application is a Continuation in Part and claims priority to Utility patent application Ser. No. 14/188,607 filed Feb. 24, 2014, entitled "MARINE WELL FOR SHALLOW-WATER FLOW MONITORING," issued as U.S. Pat. No. 8,905,155 on Dec. 9, 2014, which claims priority to and the benefit of Provisional Patent Application Ser. No. 61/859,159 filed on Jul. 26, 2013, entitled "METHOD AND SYSTEM FOR MONITORING MARINE SHALLOW-WATER FLOW DURING MARINE DRILLING OPERATIONS. These references are hereby incorporated in their entirety.

FIELD

The present embodiments generally relate to a system for monitoring for gas and oil flow venting from a surface.

BACKGROUND

A need exists for a system for monitoring for gas and oil flow venting from a surface and to provide an early indication of subterranean formation problems by analyzing bubble size, time interval, and velocity for bubbles or globules venting from a surface.

A further need exists for a system for monitoring for gas and oil flow venting from a surface utilizing a video feed and a bubble flow classification chart to create a bubble flow classification for the surface and then additionally to verify the bubble flow classification results using data feed in real time, 24 hours a day, 7 days a week, from a plurality of data feeds including but not limited to at least one of: video feeds, seismic profile data feeds, measurement while drilling data feeds, logging while drilling data feeds, drilling parameter data feeds, sonar data feeds, and hydrographic data feeds, and further to monitor bubble flow and classify additional bubble flow over time to verify that the baseline bubble flow classification of bubble flow is valid or another classification of bubble flow needs to become the new baseline bubble flow classification.

A need exists for a system for monitoring for gas and oil flow venting from a surface during marine drilling, development, or production operations.

A need exists for a system for monitoring for gas and oil flow venting from a surface that can create immediate alarms regarding potentially dangerous situations and transmit those remote alarms to client devices, such as through a network.

The present embodiments meet these needs.

BRIEF DESCRIPTION OF THE DRAWINGS

The detailed description will be better understood in conjunction with the accompanying drawings as follows:

FIGS. 4A-4C show a plurality of bubble flow categories.

Figure 1:
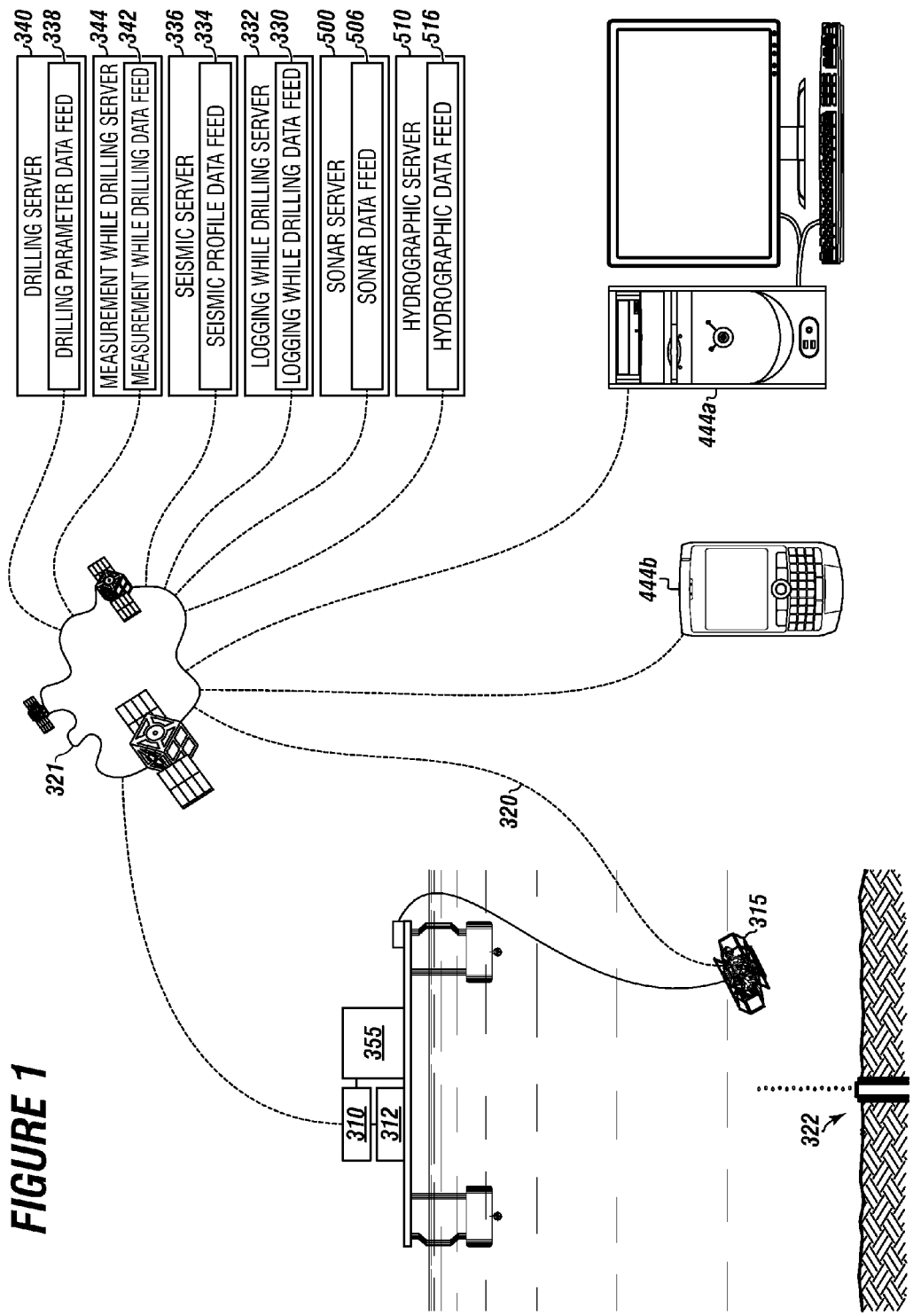
FIG. 1 depicts a diagram of a system for monitoring a surface for gas and oil flow.

The present embodiments are detailed below with reference to the listed Figures.

DETAILED DESCRIPTION OF THE EMBODIMENTS

Before explaining the system in detail, it is to be understood that the system is not limited to the particular embodiments and that it can be practiced or carried out in various ways.

The present embodiments generally relate to a system for monitoring for gas and oil flow venting from a surface.

The present embodiments use a plurality of bubble flow categories with a video feed at a first time period to determine a baseline bubble flow classification from the surface.

The embodiments use a video feed at a subsequent time period to classify a subsequent bubble flow classification from the surface.

Computer instructions in a data storage connected to a processor are used to compare the bubble flow categories and to provide a recommendation to change the baseline bubble flow classification to a subsequent bubble flow classification if warranted.

Computer instructions in the data storage are used to connect to various data feeds concerning the observed surface and compare the surface information from those data feeds to assist in assigning a bubble flow classification of gas and oil flow venting from the surface.

The various data feeds include at least one of: live video feeds, logging while drilling data feeds, seismic profile data feeds, drilling parameter data feeds, sonar data feeds, hydrographic data feeds, and measurement while drilling data feeds.

At least one of the data feeds can be provided from separate servers collecting information on the observed surface. The servers are connected to a network which communicates with an analysis processor which can be located remotely, or on a platform, such as a drilling rig.

The analysis processor communicates at least one data feed to the data storage associated with the analysis processor and uses computer instructions to perform comparisons of at least one data feed to the subsequent bubble flow classification assigned to the surface at the subsequent time period.

Computer instructions in the analysis data storage are used to create an alert transmitted by the analysis processor via the network if the computer instructions determine that a change in bubble flow classification has occurred.

In embodiments, an alert can be an alarm, an audible alarm, an email or a visual graphic displayed on a display of a client device connected to the network.

In embodiments, the bubble flow classification chart and computer instructions can be used to display a spreadsheet like report, wherein the report can provide mathematical calculations, such as an EXCEL™ spreadsheet or the like, on the display of at least one client device.

The system for monitoring the surface for gas and oil flow can transmit an alarm if the bubble flow classification is outside of predefined acceptable limits, which can vary from one situation to another and require further investigation.

The alarm can be transmitted to a plurality of users simultaneously. Early detection of hydrocarbons can be communicated for rapid response to minimize the environmental impact of the effect of hydrocarbon flows into the marine environment.

The system saves lives by eliminating the need for divers to personally go and inspect the surface to verify the bubble flow category.

The system saves lives and equipment by the early detection of potentially catastrophic events.

In embodiments, the system can be used for monitoring a marine well for gas and oil flow during marine drilling operations and for detecting gas and oil flow which can prevent the costly loss of the well, and prevent a need for additional crews to spud a new well, or respud an old well.

The system can be used for monitoring a marine well for gas and oil flow during marine drilling operations, which can prevent the need for additional heavy equipment. This system helps keep drilling rig personnel safe.

The system avoids the need to use additional high pressure nitrogen on the drilling rig. The system prevents explosions on a rig floor during cementing operations by avoiding the need for additional use of nitrogen under pressure.

The system helps reduce fossil fuel costs by saving rig time by drilling safe wells, reducing rig time, and reducing emissions and fuel consumption. There is also a concurrent reduction in man hour exposure to potential harmful activities on the rig.

To understand this invention further, various terms are used herein to describe the system for monitoring a surface for gas and oil flow.

The term "surface" as used herein can refer to a portion of the seabed, as well as pipelines, wellheads, subsea infrastructure, vents, mounds, depressions, other natural or man-made features, and combinations thereof.

The term "real time" as used herein can refer to a live video capture with optional live data capture that can occur using sensors at a moment in time that is the same moment in time that the data is captured.

The term "subsequent" as used herein can refer to a second, third, fourth, or any further term after the first.

The term "time period" as used herein can refer to the time from when observation of gas and oil flow venting from the surface for the purpose of establishing a bubble flow classification begins to when observation of gas and oil flow venting from the surface for the purpose of establishing a bubble flow classification ends.

The term "time interval" as used herein can refer to the time from when a first bubble venting from the surface is observed to the time when a second bubble venting from the surface or the time between subsequent bubbles is observed for the purpose of establishing a bubble flow classification.

The terms "system for monitoring a surface for gas and oil flow" and "system for monitoring for gas and oil flow venting from a surface" can include monitoring bubbles and globules venting from the surface.

In embodiments, the system can relate to monitoring for gas and oil flow venting from the surface.

The system for monitoring a surface for gas and oil flow can use a video feed to display the surface.

The video feed can be transmitted to an analysis processor that additionally and simultaneously receives at least one of: video feed, drilling parameter data feed, seismic profile data feed, logging while drilling data feed, sonar data feeds, hydrographic data feeds, and measurement while drilling data feed.

The video feed can be provided to the analysis processor from a video capturing device, such as an underwater camera on a remotely operated vehicle (ROV), or a camera connected to a pole or fixed structure pointed at the surface and placed underwater.

The video capture device can be operatively positioned on the surface, or positioned by attaching the video capture device to a portion of equipment adjacent to the surface or on a remotely operated vehicle (ROV) which can be tethered or tether-less, as long as the video capture device can communicate the video feed electronically to the processor, and in embodiments, to a network.

The analysis processor can be a computer, a laptop, a tablet, a portable digital device, or other computing device configured to receive, store and display video information from a video capture device.

The video feed can be transferred to the analysis processor using known telemetry, such as fiber optics, wireless transmission, or direct connection through a network.

In embodiments, if not already activated, the video feed to the analysis processor is initiated when a first bubble observed time is recorded into the analysis processor by an observer and/or a user when a first bubble is observed to flow from the surface.

In embodiments, the video feed to the analysis processor can be initiated when drilling operations begin.

An alert is generated when a first gas bubble is observed.

Figure 5:
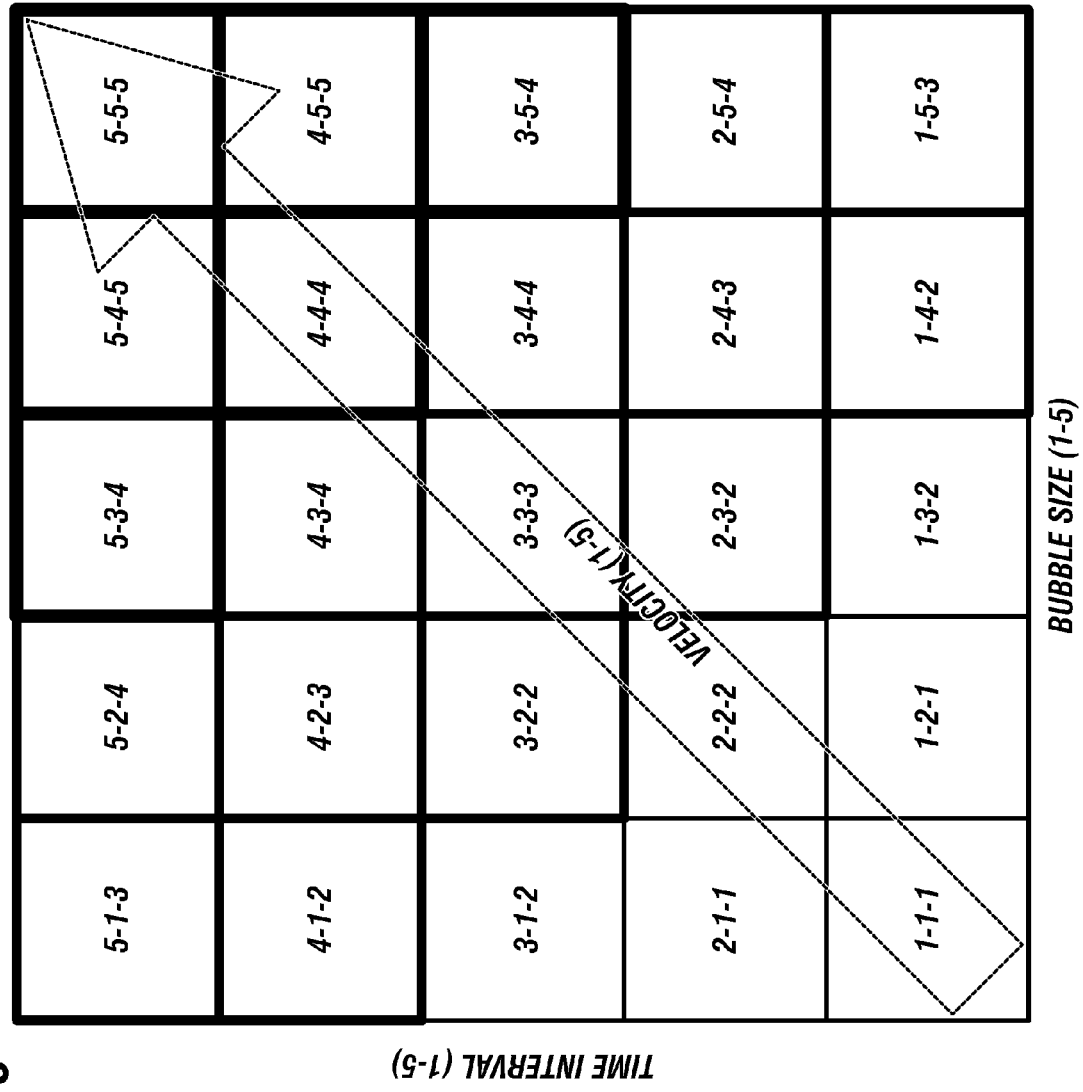
FIG. 5 shows a bubble flow classification chart, which depicts various classifications of the plurality of bubble flow categories usable with the system for monitoring gas and oil flow.

The analysis processor registers the moment in time when a first gas bubble is recorded and measures a first time interval from the moment the first gas bubble is recorded to when a second gas bubble is recorded and then a first analysis is performed using the plurality of bubble flow categories to determine a time interval, a bubble size, a velocity, or any combination thereof resulting in a bubble flow classification, which can be any of the classifications of the bubble flow classification chart as seen in FIG. 5 in the analysis data storage and designates the bubble flow classification as the baseline bubble flow classification.

The analysis processor repeats the analysis for a subsequent time period, forming a subsequent bubble flow classification. The subsequent bubble flow classification can be any of the classifications of the bubble flow classification chart as seen in FIG. 5.

If the subsequent bubble flow classification from the subsequent time period is different from the baseline bubble flow classification, for example if the subsequent bubble size of the subsequent bubble flow classification changes from the first bubble size or if the time interval or the velocity of bubble flow changes, then the analysis processor verifies if the subsequent bubble flow classification signifies a problem by checking the various data feeds for change. If a change within predefined acceptable limits is identified an alert is transmitted to the users of client devices connected to the network and the subsequent bubble flow classification becomes the baseline. If a change outside of predefined acceptable limits is identified an alarm is transmitted to the users of client devices connected to the network to investigate a potentially dangerous situation and the subsequent bubble flow classification becomes the baseline.

Turning to the Figures, FIG. 1 depicts a diagram of the system for monitoring a surface for gas and oil flow.

The system for monitoring a surface 322 can include an analysis processor 310, which can be connected to a power supply 355 and can receive a video feed 320 of the surface 322 in real time, shown as a video feed 320 from a video capture device. The video capture device is shown on a remotely operated vehicle (ROV) 315.

A surface can be a portion of the seabed, as well as pipelines, marine wells, wellheads, subsea infrastructure, vents, mounds, depressions, other natural or man-made features, and combinations thereof.

The video feed 320 can be provided by a direct connection to the analysis processor 310 or by using a network 321 in communication with the analysis processor 310. The video feed can be a live video feed.

The video feed 320 and surface information data feeds from other servers concerning the surface 322 are received by the analysis processor 310 and stored in the analysis data storage 312 connected to or in communication with the analysis processor.

If not already engaged, the video feed 320 to the analysis processor 310 is initiated when a first bubble is observed.

When a first gas bubble is observed a time marker is transmitted to the analysis processor 310 starting the analysis processor 310 computing a first time interval.

The analysis processor 310 can receive at least one of: the video feed 320, logging while drilling data feed 330 about a surface 322 provided in real time using the network 321 from a logging while drilling server 332, seismic profile data feed 334 about the surface provided in real time using the network 321 from a seismic server 336, drilling parameter data feed 338 about a surface provided in real time using the network 321 from a drilling server 340, measurement while drilling data feed 342 about the surface provided in real time from a measurement while drilling server 344, sonar data feed 506 in real time from a sonar server 500, and hydrographic data feed 516 in real time from a hydrographic server 510.

In embodiments, a single server can perform the duties of these six servers 332, 336, 340, 344, 500 and 510. In embodiments, one or more severs can be in any combination and can perform the duties of the six servers depicted.

The network 321 can also be in communication with a plurality of client devices 444a and 444b that receive alerts and/or alarms and the information on the baseline bubble flow classification and subsequent bubble flow classifications from the analysis processor 310 through the network 321.

The client devices 444a and 444b can be cellular phones, desktop computers, personal digital assistant devices, laptops, tablets, similar devices, or combinations thereof.

Figure 2:
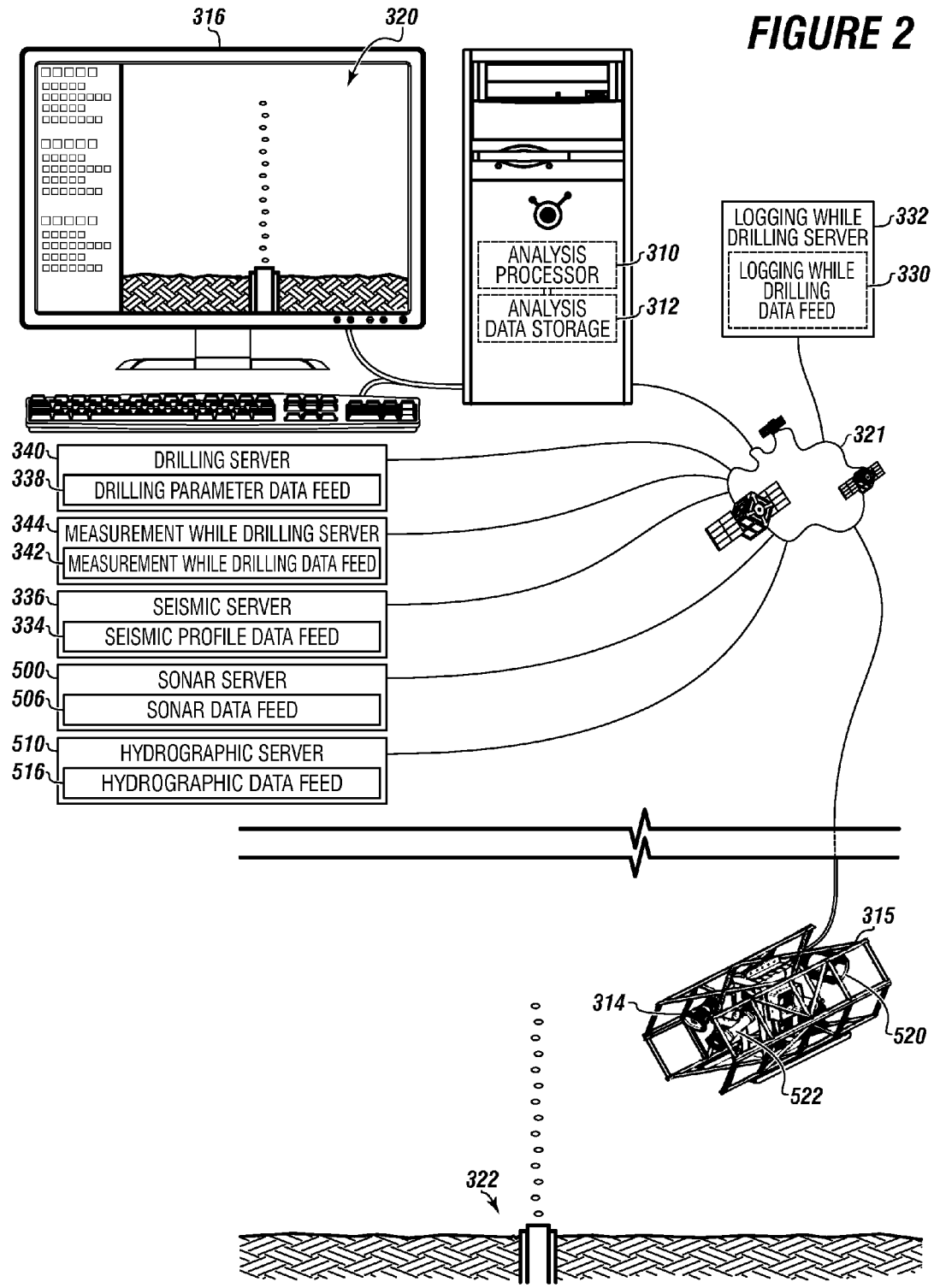
FIG. 2 depicts a detail of the system for monitoring a surface for gas and oil flow.

FIG. 2 depicts a detail of the a system for monitoring a surface 322 for gas and oil flow showing the video feed 320 on a display device 316.

The analysis processor 310 is shown in communication with the analysis data storage 312.

The analysis processor 310 connects to the display device 316, which can display the determined baseline bubble flow classification using the video feed 320 from the video capture device 314 mounted on the remotely operated vehicle (ROV) 315 and the bubble flow classification chart in the analysis data storage.

In this embodiment, the video capture device 314 is shown as an underwater camera.

A sonar capture device 520 and a hydrographic capture device 522 can also be mounted on the remotely operated vehicle (ROV), a vessel, a floating platform or vehicle, an underwater vehicle, any other underwater structure.

The analysis processor 310 can be any processor known in the art, such as a laptop, a desktop computer, a cellular phone, a tablet, or a similar device.

The display device 316 can be a monitor, a TV screen, a display on a hand held device, or the like.

The network 321 can be the internet, a global communication network, a local area network, a wide area network, a satellite network, a similar network known in the industry, or combinations thereof.

The display device 316 can be in communication with the video capture device 314 using any form of telemetry.

The video capture device 314 can be a video feed recorder on a tethered remotely operated vehicle (ROV), or a video feed recorder mounted to subsea equipment for viewing the surface 322.

The analysis data storage 312 refers to a non-transitory computer readable medium, such as a hard disk drive, solid state drive, flash drive, tape drive, and the like. The term "non-transitory computer readable medium" excludes any transitory signals but includes any non-transitory data storage circuitry, e.g., buffers, cache, and queues, within transceivers of transitory signals.

All servers of this invention can be computers, which can be in communication with the network 321 to provide additional information to the analysis processor 310 with the bubble flow classification chart contained in the analysis data storage 312.

The seismic server 336 can be a computer with a processor and a data storage containing seismic profile data feed 334, which can provide the seismic profile data to the analysis processor 310 using the network.

The measurement while drilling server 344 can be a computer with a processor and a data storage containing measurement while drilling data feed 342, which can provide the measurement while drilling data to the analysis processor 310 using the network.

The drilling server 340 can be a computer with a processor and a data storage containing drilling parameter data feed 338, which can provide the drilling parameter data to the analysis processor 310 using the network.

The logging while drilling server 332 can be a computer with a processor and a data storage containing logging while drilling data feed 330, which can provide the logging while drilling data to the analysis processor 310 using the network.

The sonar server 500 can be a computer, with a processor and a data storage containing sonar data feed 506, which can provide the sonar data to the analysis processor 310 using the network.

The hydrographic server 510 can be a computer, with a processor and a data storage containing hydrographic data feed 516, which can provide the hydrographic data to the analysis processor 310 using the network.

Figure 3A:
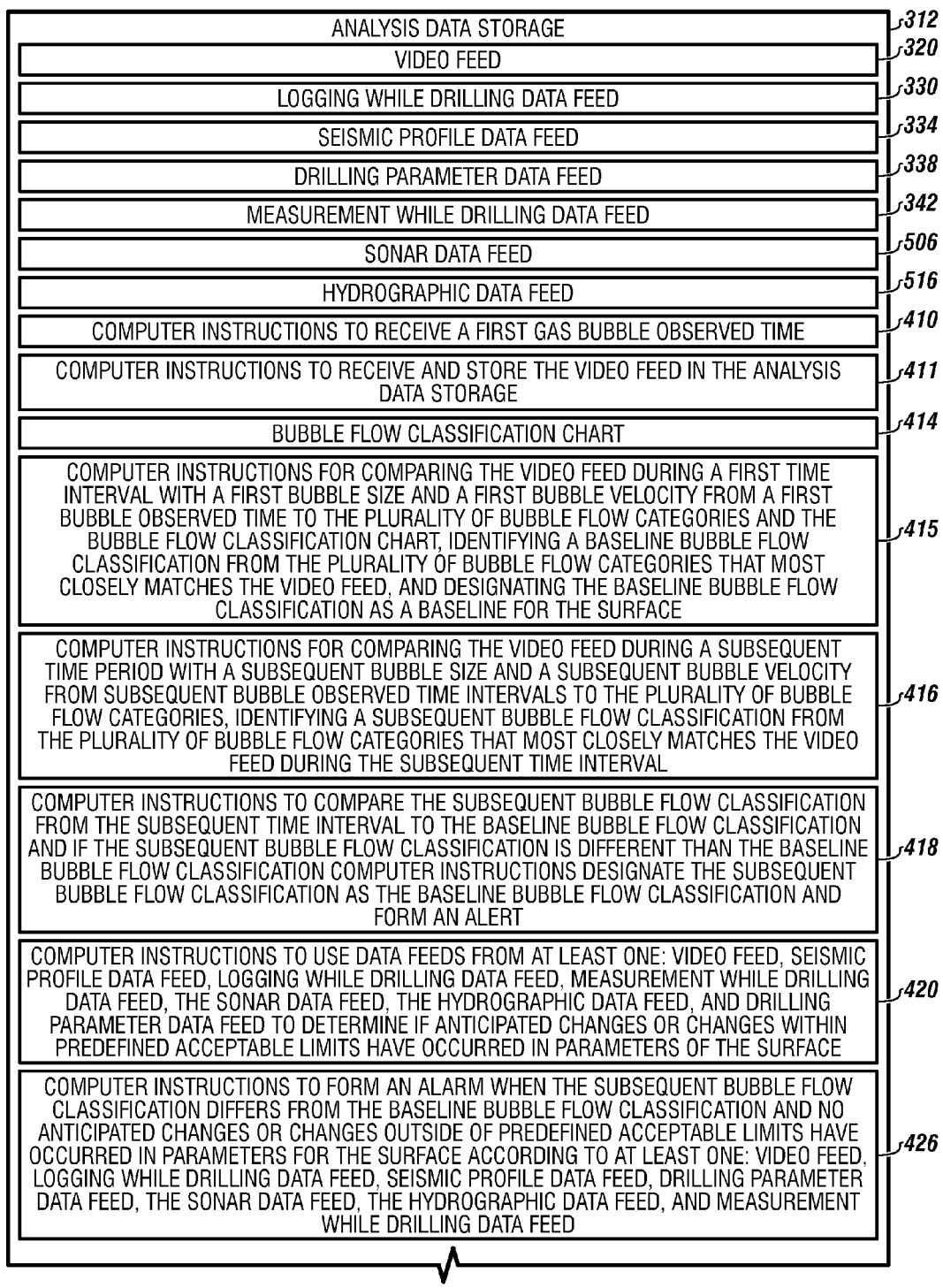
FIGS. 3A-3B depict a diagram of the computer instructions in analysis data storage which is part of the system for monitoring a surface for gas and oil flow.
Figure 3B:
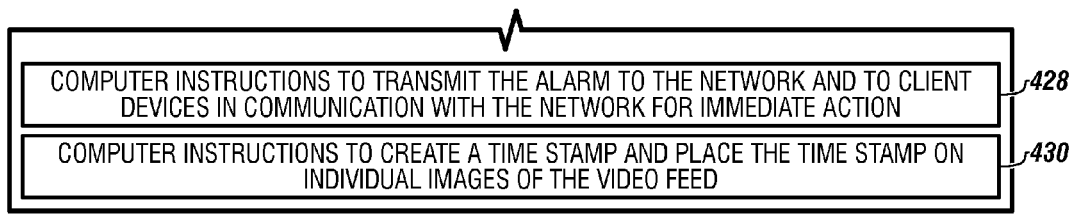

FIGS. 3A-3B depict a diagram of the computer instructions in the analysis data storage according to the gas and oil flow monitoring system.

To clarify how the hardware and computer instructions operate the following exemplary scenario is provided.

As an example, during the first time interval, from when a first gas bubble is observed until a second gas bubble is observed, the video feed from the video capture device is started and time stamps of the dates and times that the first gas bubble and second gas bubble are observed are created and stored in the analysis data storage.

The video feed is monitored for patterns of bubble flow of gas bubbles venting from the surface and a classification is determined using the plurality of bubble flow categories.

The monitored patterns are analyzed for bubble size, time interval, and velocity of upward travel of gas bubbles flowing from the surface and an initial baseline bubble flow classification is assigned.

For example, the first time interval can be the difference in time from when the first gas bubble with a first size and a first velocity to the time when a second gas bubble with a second size and a second velocity is recorded. The first time interval can be a 2 minute time interval from when a first gas bubble is recorded. The plurality of bubble flow categories are used with information from the plurality of servers on the network to assign a baseline bubble flow classification to the surface.

The surface is then observed for a subsequent time interval to establish if a subsequent pattern of bubble flow of gas bubbles venting from the surface and the subsequent bubble flow classification is different from the baseline.

The subsequent time interval can be 4 minutes.

The recorded observed patterns of bubble flow of gas bubbles for observed time intervals with bubble size and velocity are analyzed using the plurality of bubble flow classifications with each bubble flow category having a unique time interval, bubble size and velocity to assign a bubble flow classification.

If the patterns of bubble flow of gas bubbles and observed bubble sizes, time intervals, or velocities for the subsequent bubble flow classification match the baseline, then no additional analysis is needed other than continued monitoring for changes in the baseline bubble flow classification.

If the patterns of bubble flow of gas bubbles for the subsequent observed bubble size, time interval, or velocity does not match the baseline, further analysis is performed. For example, the baseline bubble flow classification can be for a first time interval of 10 seconds, a bubble size of 1 cm, and a velocity of 1 m/s producing a baseline bubble flow classification 4/1/1, and for a subsequent time interval of 2 minutes, a bubble size of 1 cm, and a velocity of 1 m/s results in a bubble flow of category 2/1/1. Since the baseline bubble flow classification does not match the subsequent bubble flow classification an analysis is performed using the video feed, the seismic profile data feed, the measurement while drilling data feed, the logging while drilling data feed, the sonar data feed, hydrographic data feed, and the drilling parameters data feed to transmit an alert and assign the subsequent bubble flow classification as the baseline bubble flow classification.

When an alert is generated, then additional analysis can be performed, including subsequent observations of the patterns of bubble flow of gas bubbles and further analysis of the video feed, the drilling parameter data feed, the seismic profile data feed, the measurement while drilling feed, the sonar data feed, the hydrographic data feed, and the logging while drilling data feed.

If the additional analysis concludes that the deviation from the baseline is due to an anticipated change or change within predefined acceptable limits in the video feed, the seismic profile data feed, the measurement while drilling data feed, the logging while drilling data feed, the sonar data feed, the hydrographic data feed, and the drilling parameters data feed, then no additional analysis is needed other than continued monitoring for changes in the baseline bubble flow classification.

If the additional analysis concludes that the deviation from the baseline is not due to an anticipated change or change within predefined acceptable limits in the video feed, the seismic profile data feed, the measurement while drilling data feed, the logging while drilling data feed, the sonar data feed, the hydrographic data feed, and the drilling parameters data feed, an alarm can be transmitted to the user of at least one client device connected to the network to investigate a potentially dangerous situation and further bubble flow analysis can be initiated. In embodiments, the alarm can be transmitted to multiple users of the plurality of client devices connected to the network The analysis data storage 312 can be connected to the video feed 320, the logging while drilling data feed 330, the seismic profile data feed 334, the drilling parameter data feed 338, the measurement while drilling data feed 342, the sonar data feed 506 and the hydrographic data feed 516.

The analysis data storage 312 can have computer instructions 410 to receive a first gas bubble observed time.

The analysis data storage 312 can have computer instructions 411 to receive and store the video feed in the analysis data storage.

The analysis data storage 312 can contain a bubble flow classification chart 414, which can provide a plurality of bubble flow classifications of bubble flow for the surface.

The analysis data storage 312 can have computer instructions 415 for comparing the video feed during a first time interval with a first bubble size and a first bubble velocity from a first bubble observed time to the plurality of bubble flow categories and the bubble flow classification chart, identifying a baseline bubble flow classification from the plurality of bubble flow categories that most closely matches the video feed, and designating the baseline bubble flow classification for the surface.

The analysis data storage 312 can have computer instructions 416 for comparing the video feed during a subsequent time period with a subsequent bubble size and a subsequent bubble velocity from subsequent bubble observed time intervals to the plurality of bubble flow categories, identifying a subsequent bubble flow classification from the plurality of bubble flow categories that most closely matches the video feed during the subsequent time interval.

The analysis data storage 312 can have computer instructions 418 to compare the subsequent bubble flow classification from the subsequent time interval to the baseline bubble flow classification and if the subsequent bubble flow classification is different than the baseline bubble flow classification computer instructions designate the subsequent bubble flow classification as the baseline bubble flow classification and form an alert.

The analysis data storage 312 can have computer instructions 420 to use data feeds from at least one: video feed, seismic profile data feed, logging while drilling data feed, measurement while drilling data feed, the sonar data feed, the hydrographic data feed, and drilling parameter data feed to determine if anticipated changes or changes within predefined acceptable limits have occurred in parameters of the surface.

The analysis data storage 312 can have computer instructions 426 to form an alarm when the subsequent bubble flow classification differs from the baseline bubble flow classification and no anticipated changes or changes outside of predefined acceptable limits have occurred in parameters for the surface according to at least one: video feed, logging while drilling data feed, seismic profile data feed, drilling parameter data feed, the sonar data feed, the hydrographic data feed, and measurement while drilling data feed.

The analysis data storage 312 can have computer instructions 428 to transmit the alarm to the network and to client devices in communication with the network for immediate action.

The analysis data storage 312 can have computer instructions 430 to create a time stamp and place the time stamp on individual images of the video feed.

FIGS. 4A-4C show the plurality of bubble flow categories.

FIG. 4A depicts one of the pluralities of bubble flow categories, shown as time interval bubble flow categories, with differing bubble time intervals and non-changing size and non-changing velocity.

For example, a bubble every 2 minutes having a size of <1 cm with a velocity of <1 meter every second observed out of the surface would be classified as 1/1/1.

For example, a bubble every 2-1 minute having a size of <1 cm with a velocity of <1 meter every second observed out of the surface would be classified as 2/1/1.

FIG. 4B depicts one of the pluralities of bubble flow categories, shown as size bubble flow categories, with differing bubble sizes and non-changing time intervals and non-changing bubble velocity For example, a bubble every 2 minutes having a size of <1 cm with a velocity of <1 meter every second observed out of the surface would be classified as 1/1/1.

For example, a bubble every 2 minutes having a size of 1-3 cm with a velocity of <1 meter every second observed out of the surface would be classified as 1/2/1.

FIG. 4C depicts one of the pluralities of bubble flow categories, shown as velocity bubble flow categories, with differing bubble velocities and non-changing size and non-changing time intervals.

For example, a bubble every 2 minutes having a size of <1 cm with a velocity of <1 meter every second observed out of the surface would be classified as 1/1/1.

For example, a bubble every 2 minutes having a size of <1 cm with a velocity of 1 meter every second observed out of the surface would be classified as 1/1/2.

The analysis data storage contains computer instructions that use the video feed and compares the video feed to images of each bubble flow category.

In an embodiment, the computer instructions can be used to form a baseline bubble flow classification and identify trends of changes in bubble flow patterns of bubbles out of the surface using the observed time intervals, bubble sizes, and bubble flow velocity patterns.

For example, if a bubble flow pattern is identified during a first time period of 2 minutes with a first time interval of 45 seconds, a first bubble size of 2 cm and with a first velocity of 3 m/s as bubble flow category 3/2/4 and assigned bubble flow category 3/2/4 as the baseline bubble flow classification, and during a subsequent time period of 2 minutes a subsequent bubble flow category is identified with a second time interval of 25 seconds, a second bubble size of 2 cm and with a second velocity of 3 m/s a bubble flow classification 4/2/4 is identified, then the baseline bubble flow classification can be changed to the different category 4/2/4 as "a new baseline bubble flow classification".

FIG. 5 shows a bubble flow classification chart, which depicts a portion of the various possible combinations of the plurality of bubble flow categories usable with the system for monitoring gas and oil flow venting from a surface.

The bubble flow classification chart includes one hundred twenty five bubble flow classifications.

Figure 6:
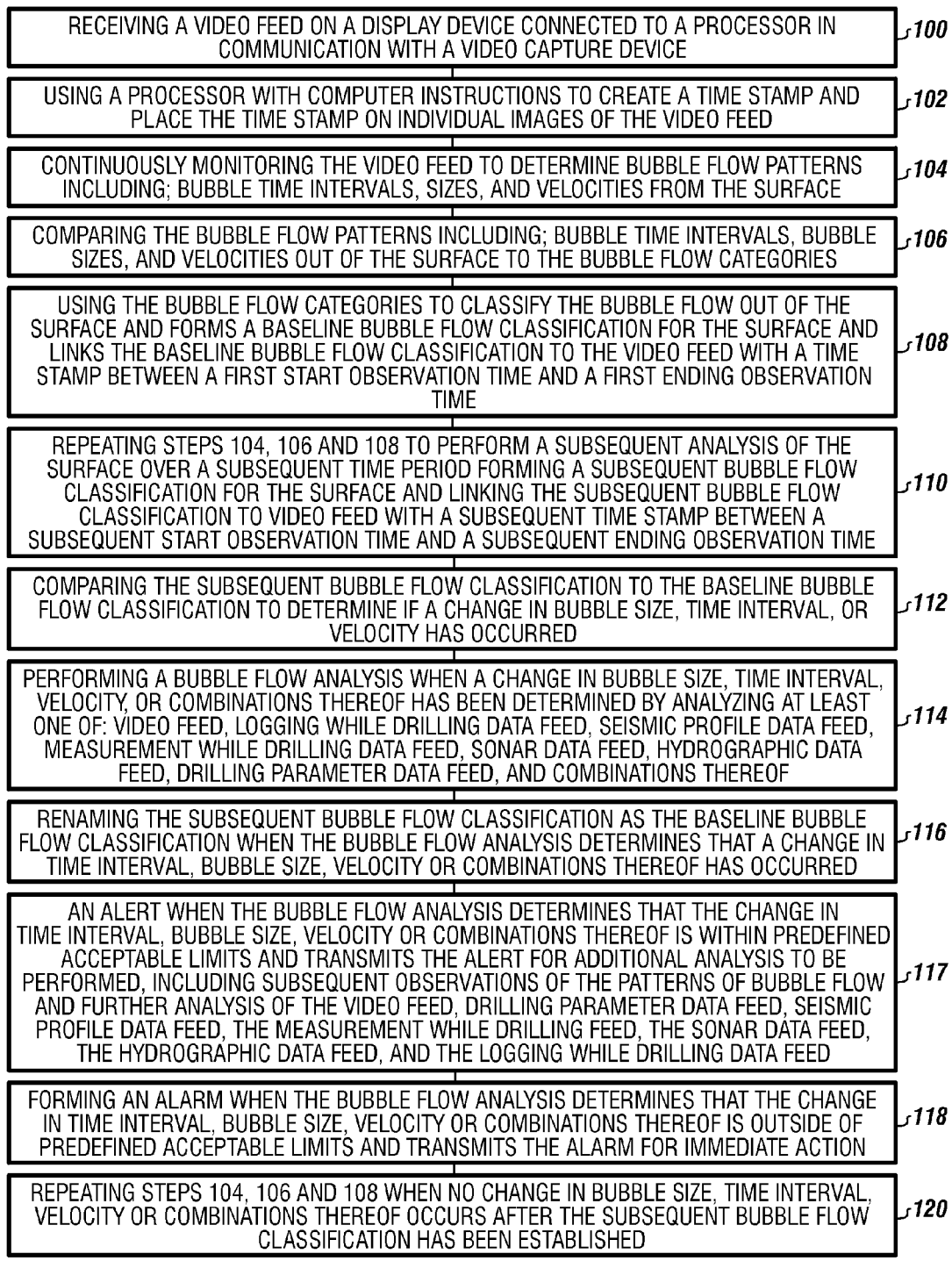
FIG. 6 is an embodiment of a series of steps performed by the system for monitoring a surface for gas and oil flow.

FIG. 6 describes an embodiment of a series of steps used by a system for monitoring a surface for gas and oil flow according to one or more embodiments.

The video feed can be continuously monitored by the analysis processor using the bubble flow categories and the bubble flow classification chart to determine bubble flow patterns and rates including time intervals, bubble size, and velocities of the surface being observed.

The system for monitoring gas and oil flow venting from a surface receives a video feed on a display device connected to a processor in communication with a video capture device, shown as step 100.

The video feed can include images of the surface before the first bubble observed time until after a bubble flow classification is identified.

The system for monitoring gas and oil flow venting from a surface uses a processor with computer instructions to create a time stamp and place the time stamp on individual images of the video feed, shown as step 102.

The system for monitoring gas and oil flow venting from a surface continuously monitors the video feed to determine bubble flow patterns including; bubble time intervals, sizes, and velocities from the surface, shown as step 104.

The system for monitoring gas and oil flow venting from a surface compares the bubble flow patterns including; bubble time intervals, bubble sizes, and velocities out of the surface to the bubble flow categories, shown as step 106.

The system for monitoring gas and oil flow venting from a surface uses the bubble flow categories to classify the bubble flow out of the surface and forms a baseline bubble flow classification for the surface and links the baseline bubble flow classification to the video feed with a time stamp between a first start observation time and a first ending observation time, shown as step 108.

The system for monitoring gas and oil flow venting from a surface repeats steps 104, 106 and 108 to perform a subsequent analysis of the surface over a subsequent time period forming a subsequent bubble flow classification for the surface and linking the subsequent bubble flow classification to video feed with a subsequent time stamp between a subsequent start observation time and a subsequent ending observation time, shown as step 110.

The system for monitoring gas and oil flow venting from a surface compares the subsequent bubble flow classification to the baseline bubble flow classification to determine if a change in bubble size, time interval, or velocity has occurred, shown as step 112.

The system for monitoring gas and oil flow venting from a surface performs a bubble flow analysis when a change in bubble size, time interval, velocity, or combinations thereof has been determined by analyzing at least one of: video feed, logging while drilling data feed, seismic profile data feed, measurement while drilling data feed, sonar data feed, hydrographic data feed, drilling parameter data feed, and combinations thereof, shown as step 114.

Bubble flow analysis includes the evaluation of at least one of: video feed, logging while drilling data feed, seismic profile data feed, sonar data feed, hydrographic data feed, measurement while drilling data feed, and drilling parameter data feed.

The system for monitoring gas and oil flow venting from a surface renames the subsequent bubble flow classification as the baseline bubble flow classification when the bubble flow analysis determines that a change in time interval, bubble size, velocity or combinations thereof has occurred, shown as step 116.

The system for monitoring gas and oil flow venting from a surface forms an alert when the bubble flow analysis determines that the change in time interval, bubble size, velocity or combinations thereof is within predefined acceptable limits and transmits the alert for additional analysis to be performed, including subsequent observations of the patterns of bubble flow and further analysis of the video feed, drilling parameter data feed, seismic profile data feed, the measurement while drilling feed, the sonar data feed, the hydrographic data feed, and the logging while drilling data feed, shown as step 117.

The system for monitoring gas and oil flow venting from a surface forms an alarm when the bubble flow analysis determines that the change in time interval, bubble size, velocity or combinations thereof is outside of predefined acceptable limits and transmits the alarm for immediate action, shown as step 118.

In embodiments, the alarm can be transmitted through the network to the plurality of client devices.

The system for monitoring gas and oil flow venting from a surface can repeat steps 104, 106 and 108 when no change in bubble size, time interval, velocity or combinations thereof occurs after the subsequent bubble flow classification has been established, shown as step 120.

The system can be repeated for multiple subsequent time periods.

FIGS. 7A-7F show each of the servers having a processor and data storage.

Figure 7A:
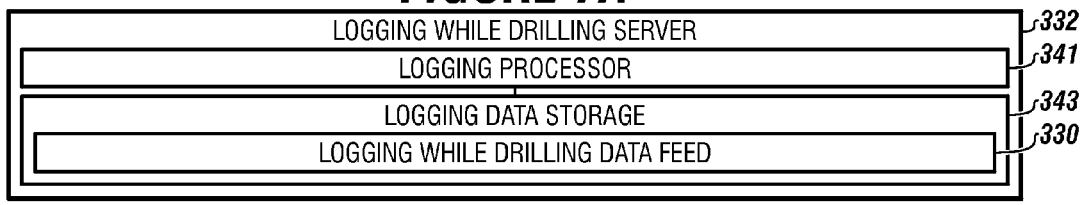
FIGS. 7A-7F depict diagrams of the various servers usable by the system with gas and oil flow monitoring.

FIG. 7A shows a logging while drilling server 332 with a logging processor 341 and a logging data storage 343. The logging data storage can have a logging while drilling data feed 330.

Figure 7B:
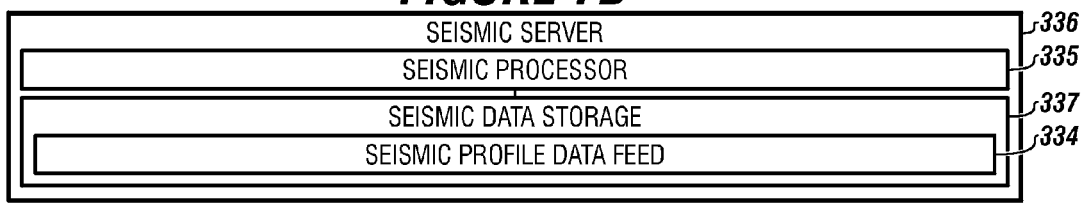

FIG. 7B shows seismic server 336 with a seismic processor 335 and a seismic data storage 337. The seismic data storage can have a seismic profile data feed 334.

Figure 7C:
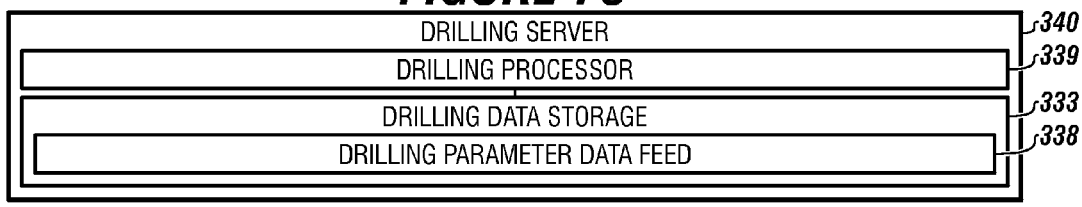

FIG. 7C shows a drilling server 340 with a drilling processor 339 and a drilling data storage 333. The drilling data storage can have a drilling parameter data feed 338.

Figure 7D:
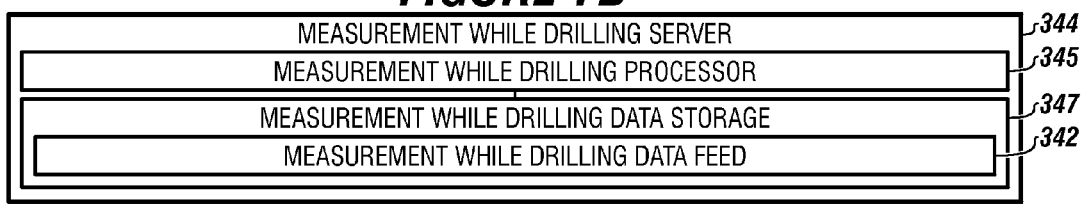

FIG. 7D shows a measurement while drilling server 344 with a measurement while drilling processor 345 and a measurement while drilling data storage 347. The measurement while drilling data storage can have a measurement while drilling data feed 342.

Figure 7E:
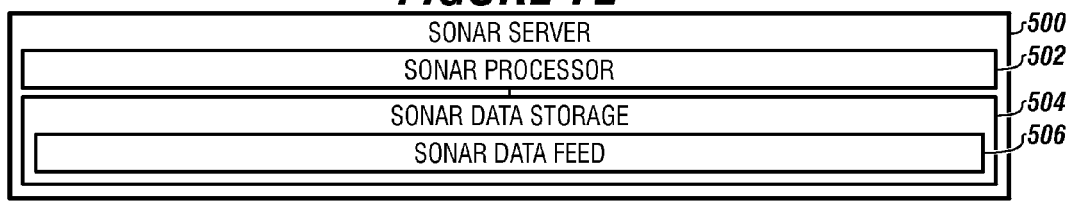

FIG. 7E shows a sonar server 500 with a sonar processor 502 and a sonar data storage 504. The sonar data storage 504 can have a sonar data feed 506.

Figure 7F:
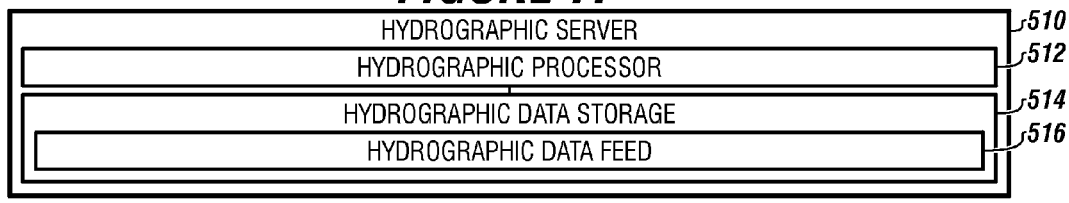

FIG. 7F shows a hydrographic server 510 with a hydrographic processor 512 and a hydrographic data storage 514. The hydrographic data storage 514 can have a hydrographic data feed 516.

As an example, the system for monitoring gas and oil flow venting from a surface can be used as follows:

During a first time period when a first bubble is observed, the system can record a surface with a video feed.

The system can record a time when the first bubble is observed from the surface, starting the first time interval.

The system can record a time when the second bubble is observed from the surface, ending the first time interval.

The system can record a time when a first bubble flow category is identified, ending the first time period.

The system can compare the video feed to the plurality of bubble flow categories to identify a classification that most closely matches the video feed and can assign this classification as the baseline bubble flow classification to the surface.

During a subsequent time interval when a third and fourth bubble is observed, the system can record the surface with a subsequent video feed.

The system can compare the subsequent video feed to the bubble flow categories to identify a subsequent bubble flow classification that most closely matches the subsequent video feed.

A first bubble observed time is inputted into the analysis processor by an observer and/or a user when a first bubble is observed to flow from the surface.

While these embodiments have been described with emphasis on the embodiments, it should be understood that within the scope of the appended claims, the embodiments might be practiced other than as specifically described herein.

What is claimed is:

1. A system for monitoring for gas and oil flow venting from a surface, wherein the system comprises:
   a. a video feed from a video capture device;
   b. an analysis processor connected to a network for receiving the video feed;
   c. an analysis data storage connected to the analysis processor, wherein the analysis data storage is a non-transitory computer readable medium;
   d. computer instructions in the analysis data storage to receive a first bubble observed time inputted into the analysis processor when a first bubble is observed to flow from the surface;
   e. computer instructions in the analysis data storage to receive and store the video feed in the analysis data storage;
   f. a plurality of bubble flow categories in the analysis data storage providing a plurality of bubble time intervals, bubble sizes, and bubble velocities;
   g. a bubble flow classification chart in the analysis data storage providing a plurality of bubble flow classifications of bubble flow from the surface;
   h. computer instructions in the analysis data storage for comparing the video feed during a first time interval from the first bubble observed time to the plurality of bubble flow categories, identifying a bubble flow classification from the bubble flow classification chart that most closely matches the video feed during a first time interval, and designating the bubble flow classification as a baseline bubble flow classification for the surface;
   i. computer instructions in the analysis data storage for comparing the video feed during a subsequent time period from a subsequent first bubble observed time to the plurality of bubble flow categories, identifying a subsequent bubble flow classification from the bubble flow classification chart that most closely matches the video feed during a subsequent time interval;
   j. computer instructions in the analysis data storage to compare the subsequent bubble flow classification from the subsequent time period to the baseline bubble flow classification, and if the baseline bubble flow classification is different the computer instructions designate the subsequent bubble flow classification as the baseline bubble flow classification and generate an alert;
   k. computer instructions in the analysis data storage to use data feeds from at least one of: the video feed, a seismic profile data feed, a logging while drilling data feed, a measurement while drilling data feed, a drilling parameters data feed, a sonar data feed, or a hydrographic data feed to determine if anticipated changes or changes within predefined acceptable limits have occurred in the data feeds;
   l. computer instructions in the analysis data storage to form an alarm when the subsequent bubble flow classification differs from the baseline bubble flow classification and no anticipated changes or changes outside of predefined acceptable limits have occurred in the data feeds according to at least one: the video feed, the logging while drilling data feed, the seismic profile data feed, the drilling parameter data feed, the measurement while drilling data feed, the sonar data feed, or the hydrographic data feed; and
   m. computer instructions in the analysis data storage to transmit the alarm to the network and to at least one client device in communication with the network for immediate action.

2. The system for monitoring for gas and oil flow venting from the surface of claim 1, wherein the analysis processor receives at least one of:
   a. the video feed in real time from the video capture device using the network;
   b. the logging while drilling data feed provided in real time from a logging while drilling server using the network;

c. the seismic profile data feed provided in real time from a seismic server using the network;
d. the drilling parameter data feed provided in real time from a drilling server using the network;
e. the measurement while drilling data feed provided in real time from a measurement while drilling server using the network
f. the sonar data feed provided in real time from a sonar server using the network;
g. the hydrographic data feed from a hydrographic server using the network; or
h. combinations thereof.

3. The system for monitoring for gas and oil flow venting from the surface of claim 1, wherein the plurality of bubble flow classifications are characterized by the combination of the plurality of bubble flow categories:
a. a time interval;
b. a bubble size; and
c. a velocity.

4. The system for monitoring for gas and oil flow venting from the surface of claim 1, comprising a power supply connected to the video capture device.

5. The system for monitoring for gas and oil flow venting from the surface of claim 2, wherein the logging while drilling server comprises a logging processor with a logging data storage to store and provide the logging while drilling data feed in real time to the network.

6. The system for monitoring for gas and oil flow venting from the surface of claim 2, wherein the seismic server comprises a seismic processor with a seismic data storage to store and provide the seismic profile data in real time to the network.

7. The system for monitoring for gas and oil flow venting from the surface of claim 2, wherein the drilling server comprises a drilling parameter processor with a drilling data storage to store and provide the drilling parameters in real time to the network.

8. The system for monitoring for gas and oil flow venting from the surface of claim 2, wherein the measurement while drilling server comprises a measurement while drilling processor with a measurement while drilling data storage to store and provide the measurement while drilling data feed in real time to the network.

9. The system for monitoring for gas and oil flow venting from the surface of claim 2, wherein the sonar server comprises a sonar processor with a sonar data storage to store and provide the sonar data feed in real time to the network.

10. The system for monitoring for gas and oil flow venting from the surface of claim 2, wherein the hydrographic server comprises a hydrographic processor with a hydrographic data storage to store and provide the hydrographic data feed in real time to the network.

11. The system for monitoring for gas and oil flow venting from the surface of claim 1, wherein the at least one client device is at least one of: a laptop, a computer, a cellular phone, a personal digital assistant, or a remote monitoring device with a display for presenting the status of the surface to an observer or a user.

12. The system for monitoring for gas and oil flow venting from the surface of claim 1, further comprising in the analysis data storage computer instructions to create a time stamp and place the time stamp on individual images of the video feed.

* * * * *